US012149808B2

(12) United States Patent
Kim et al.

(10) Patent No.: US 12,149,808 B2
(45) Date of Patent: Nov. 19, 2024

(54) VIDEO CAMERA INCLUDING BODY AND STAND

(71) Applicant: LG ELECTRONICS INC., Seoul (KR)

(72) Inventors: Youngil Kim, Seoul (KR); Seongcheol Lee, Seoul (KR); Jonghyun Park, Seoul (KR); Heesoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 86 days.

(21) Appl. No.: 17/953,856

(22) Filed: Sep. 27, 2022

(65) Prior Publication Data

US 2024/0022802 A1    Jan. 18, 2024

(30) Foreign Application Priority Data

Jul. 18, 2022    (WO) ................ PCT/KR2022/010443

(51) Int. Cl.
*H04N 23/54*    (2023.01)
*H04N 23/51*    (2023.01)

(52) U.S. Cl.
CPC ............. *H04N 23/54* (2023.01); *H04N 23/51* (2023.01)

(58) Field of Classification Search
CPC ......... H04N 23/54; H04N 23/51; H04N 23/00
See application file for complete search history.

(56) References Cited

U.S. PATENT DOCUMENTS

| | | | |
|---|---|---|---|
| 2014/0263939 A1* | 9/2014 | Rinner | ................ F16M 11/105 248/688 |
| 2017/0013228 A1 | 1/2017 | Kalendra et al. | |

FOREIGN PATENT DOCUMENTS

| | | | |
|---|---|---|---|
| CN | 211821630 | | 10/2020 |
| CN | 212628117 | | 2/2021 |
| CN | 216643532 | | 5/2022 |
| CN | 216643532 U | * | 5/2022 |
| KR | 101888538 | | 8/2018 |

OTHER PUBLICATIONS

PCT International Application No. PCT/KR2022/010443, Written Opinion and International Search Report dated Apr. 18, 2023, 11 pages.

* cited by examiner

*Primary Examiner* — Ahmed A Berhan
(74) *Attorney, Agent, or Firm* — LEE, HONG, DEGERMAN, KANG & WAIMEY (57)    ABSTRACT

Disclosed is a video camera, including a body, a camera module installed in the body, and a stand located under the body to support, the stand including a leg bracket coupled to the body, a first leg rotatably coupled to the leg bracket through a first hinge, and a second leg rotatably coupled to an end portion of the first leg through a second hinge, wherein an angle and height of the body are adjustable by adjusting angles of the first and second hinges. Accordingly, the video camera can be installed not only on a floor, but also on a monitor or a wall, thereby being easily installed in various places.

12 Claims, 10 Drawing Sheets

VIDEO CAMERA INCLUDING BODY AND STAND

CROSS-REFERENCE TO RELATED APPLICATIONS

Pursuant to 35 U.S.C. § 119, this application claims the benefit of an earlier filing date and right of priority to International Application No. PCT/KR2022/010443, filed on Jul. 18, 2022, the contents of which are hereby incorporated by reference herein its entirety.

BACKGROUND OF THE DISCLOSURE

Field of the Disclosure

The present disclosure relates to a video camera, and more particularly, to a camera capable of collecting various information's and having no restriction on an installation location. The present disclosure relates to a video camera with an improved freedom degree and an improved fixing force of a stand on which the video camera is mounted.

Discussion of the Related Art

In general, a web camera is attached to a top side of a monitor and may be connected to a computer by providing a USB port, an HDMI port, or the like. It is possible to photograph a user's face from the top side of the monitor, and has been used for video conferences or video calls.

A web camera is generally configured in a manner of being fixed to a top side of a monitor using a member such as a clip. Since a web camera is limitedly configured in a manner of being fastened to an upper part of a monitor, its installation place is limited.

As thickness of a monitor is diverse and a size of a bezel tends to decrease, there are many monitors to which a web camera stand fixed to a monitor top bezel in the form of a clip is not applicable, thereby causing a problem of poor versatility.

In addition, as the number of IOT devices at home has increased recently, home cameras have emerged as cameras to detect users and recognize gestures indoors in addition to the usage of taking pictures of users' faces when computers are used.

Existing home cameras were used to film indoors like CCTV for the purpose of observing pets or children and are installed on tables or ceilings.

In addition, since an environment is being created to conduct non-face-to-face tasks such as video conferencing and telemedicine instead of face-to-face tasks, the demand for video cameras for video conferencing or telemedicine is increasing.

In particular, regarding patients, since a patient who is lying down due to discomfort in movement has difficulty in being diagnosed while sitting in front of a computer monitor, it is difficult to use a web camera installed at a top side of a monitor only or a home camera installed in a manner of being fixed to a ceiling or the like.

There is a need for a video camera that can collect a variety of information and is unrestricted in its installation location.

SUMMARY OF THE DISCLOSURE

Accordingly, embodiments of the present disclosure are directed to a video camera that substantially obviates one or more problems due to limitations and disadvantages of the related art.

One object of the present disclosure is to provide a video camera including a stand that may be mounted in various places.

In particular, one object of the present disclosure is to provide a video camera that can be mounted on a floor, attached to a wall, and mounted on various types of display devices.

Additional advantages, objects, and features of the disclosure will be set forth in the disclosure herein as well as the accompanying drawings. Such aspects may also be appreciated by those skilled in the art based on the disclosure herein.

To achieve these objects and other advantages and in accordance with the purpose of the disclosure, as embodied and broadly described herein, a video camera according to one embodiment of the present disclosure may include a body, a camera module installed in the body, and a stand located under the body to support, the stand including a leg bracket coupled to the body, a first leg rotatably coupled to the leg bracket through a first hinge, and a second leg rotatably coupled to an end portion of the first leg through a second hinge, wherein an angle and height of the body are adjustable by adjusting angles of the first and second hinges.

The leg bracket may be fastened to a backside of the body and a front leg located on a bottom front side of the body may be further included.

The front leg may be hinged to a bottom side of the body so as to contact the bottom side of the body or extending a vertical direction of the bottom side of the body.

The video camera may include a security hole located in the second leg so as to have a lock device coupled thereto.

The security hole may be formed in a protrusion portion protruding from the second leg, and the protrusion portion may be located in a backside direction of the body while the second leg and the first leg are folded to form an angle of 0° in between.

A pair of the first legs may be provided to left and right sides of the body, respectively and the second leg may be located between a pair of the first legs so as to be connected to a pair of the first legs on both sides thereof through the second hinges, respectively.

The video camera may further include a cable terminal located between a pair of the first legs of the body.

The second leg may form a same plane with the first leg while the second leg and the first leg are folded to form an angle of 0° in between.

The video camera may include a tripod nut provided to a bottom side of the second leg.

The video camera may further include a magnet provided to the second leg.

The first leg may include an upper leg connected to the first hinge and a lower leg extending from the upper leg by being bent with respect to the upper leg.

Accordingly, the present disclosure provides the following effects and/or advantages.

A video camera of the present disclosure may be installed not only on a floor, but also on a monitor or wall, so that it may be easily installed in various places.

A video camera of the present disclosure may be provided with two hinges and installed on displays having various shapes and thicknesses.

In addition, a video camera of the present disclosure has a wide area of a mounting surface, thereby being mounted stably.

Effects obtainable from the present disclosure may be non-limited by the above-mentioned effects. And, other unmentioned effects can be clearly understood from the following description by those having ordinary skill in the technical field to which the present disclosure pertains.

BRIEF DESCRIPTION OF THE DRAWINGS

The present invention will become more fully understood from the detailed description given herein below and the accompanying drawings, which are given by illustration only, and thus are not limitative of the present invention.

DETAILED DESCRIPTION OF THE DISCLOSURE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
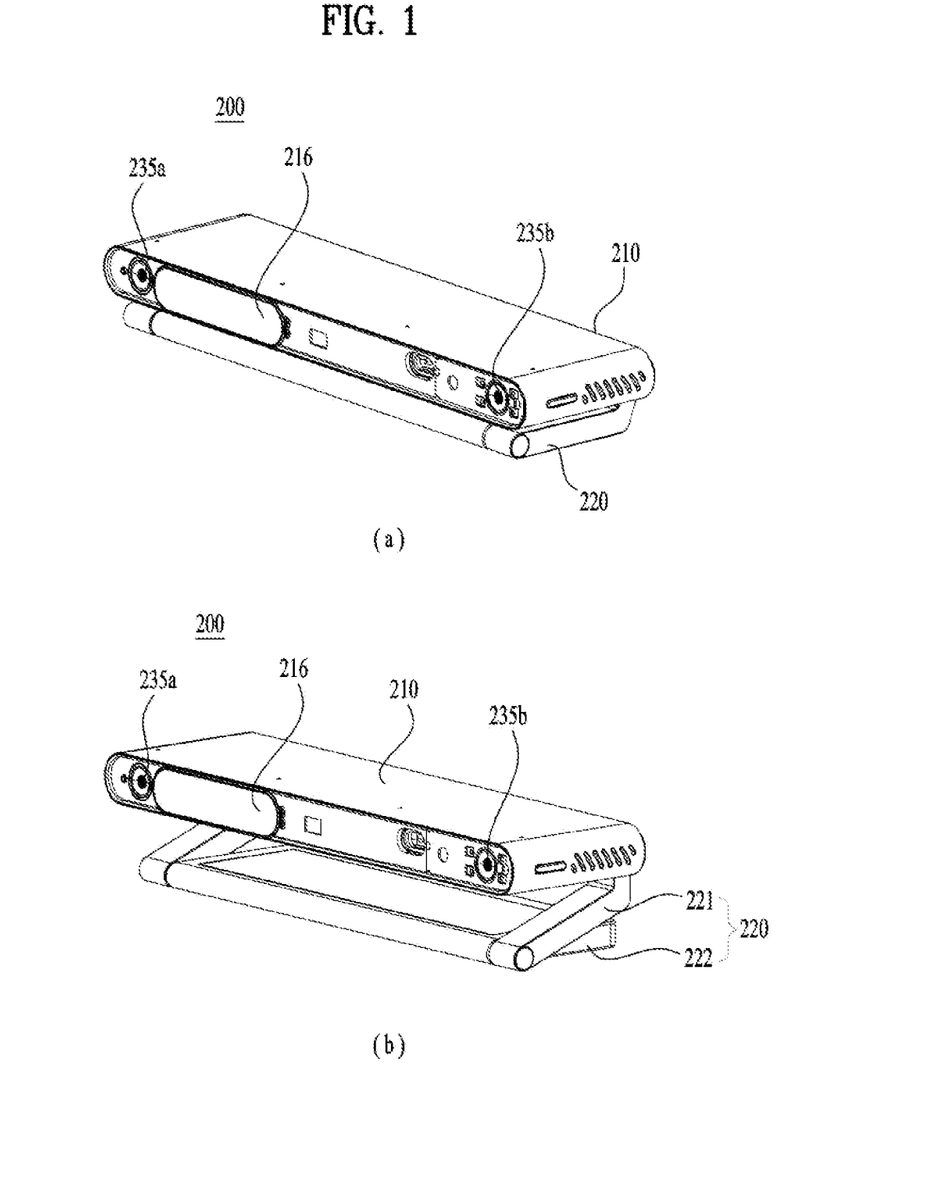
FIG. 1 and FIG. 2 are diagrams showing an installation example of a video camera according to the present disclosure.

FIG. 1 is a diagram showing a video camera 200 according to the present disclosure. A video camera according to the present disclosure includes a body in a box shape and a stand supporting a bottom side of the body. The body has a camera located on a front side to perform telemedicine, video conference and the like by photographing and transmitting a user's face and the like to a remote place.

To collect more specific information using a plurality of cameras and obtain a sense of perspective such as a human eye using a plurality of cameras, the body may be provided with a long shape in a horizontal direction. The body is implemented thinly to provide an advantage in that the body does not stand out when disposed on a top side of a monitor or the like.

The stand is a device on which the body is mounted. For a conventional web camera, the stand is mainly formed as tongs or a clamp to be fixed to a top side of a monitor. For a home camera, the stand has an angle-adjustable configuration when mounted on a table or attached to a ceiling.

As shown in FIG. 1, the stand of the present disclosure includes a pair of legs and a pair of hinges, and may adjust the height and angle of the body by adjusting the angles of a pair of the hinges. The second leg serves to fix the stand to a mounting surface and the angle and height of the body may be adjusted through the first leg connecting the main body and the second leg.

As shown in FIG. 1(a), while the first leg and the second leg are overlapped, the body is disposed in a manner of adhering to the mounting surface. As shown in FIG. 1 (b), the height and angle of the body may be controlled by adjusting the angle between the first leg and the body and the angle between the second leg and the first leg.

The stand including a pair of the legs and a pair of the hinges of the present disclosure minimizes the limitation of an installation location and freely adjusts the height and angle after installation, thereby improving the availability of the video camera.

Figure 2:
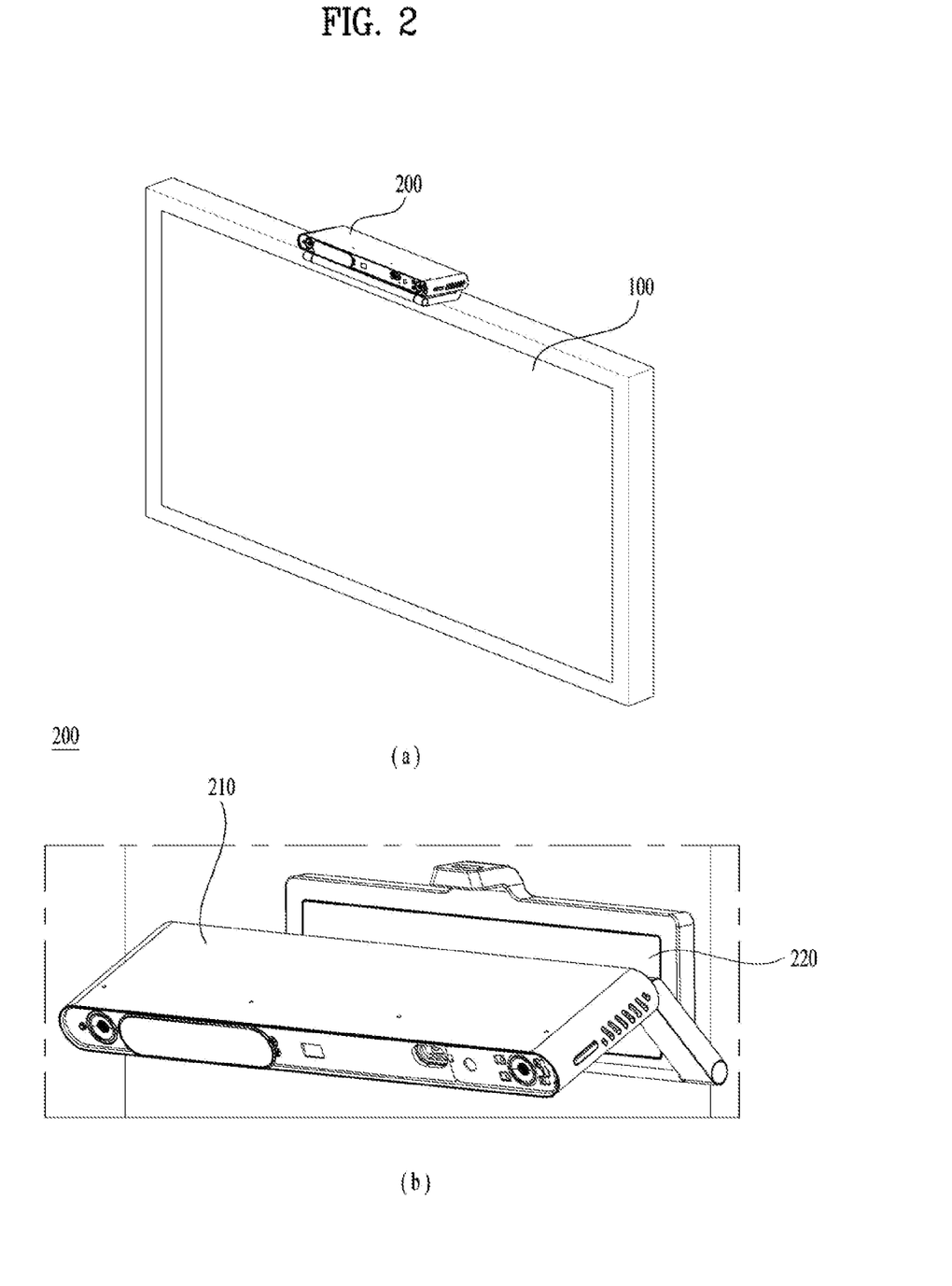

FIG. 2 is a diagram showing an installation example of a video camera 200 of the present disclosure. The video camera 200 of the present invention includes a housing 211a and 211b of a body 210 in which electronic components such as cameras 235a and 235b and the like are installed and a stand 220 configured to fixing the video camera 200 to a mounting surface.

In addition to the method of mounting on the floor as shown in FIG. 1, the stand of the present disclosure invention may be fixed to a top side of a display device 100 or a wall surface as shown in FIG. 2.

As shown in FIG. 2(a), the stand may be fixed to a top side of a display unit. The stand may be stably fixed to a top side of a display device 100, of which bezel becomes narrower and thinner recently. In addition, as shown in FIG. 2(b), the stand may also be fixed to a wall surface.

Figure 3:
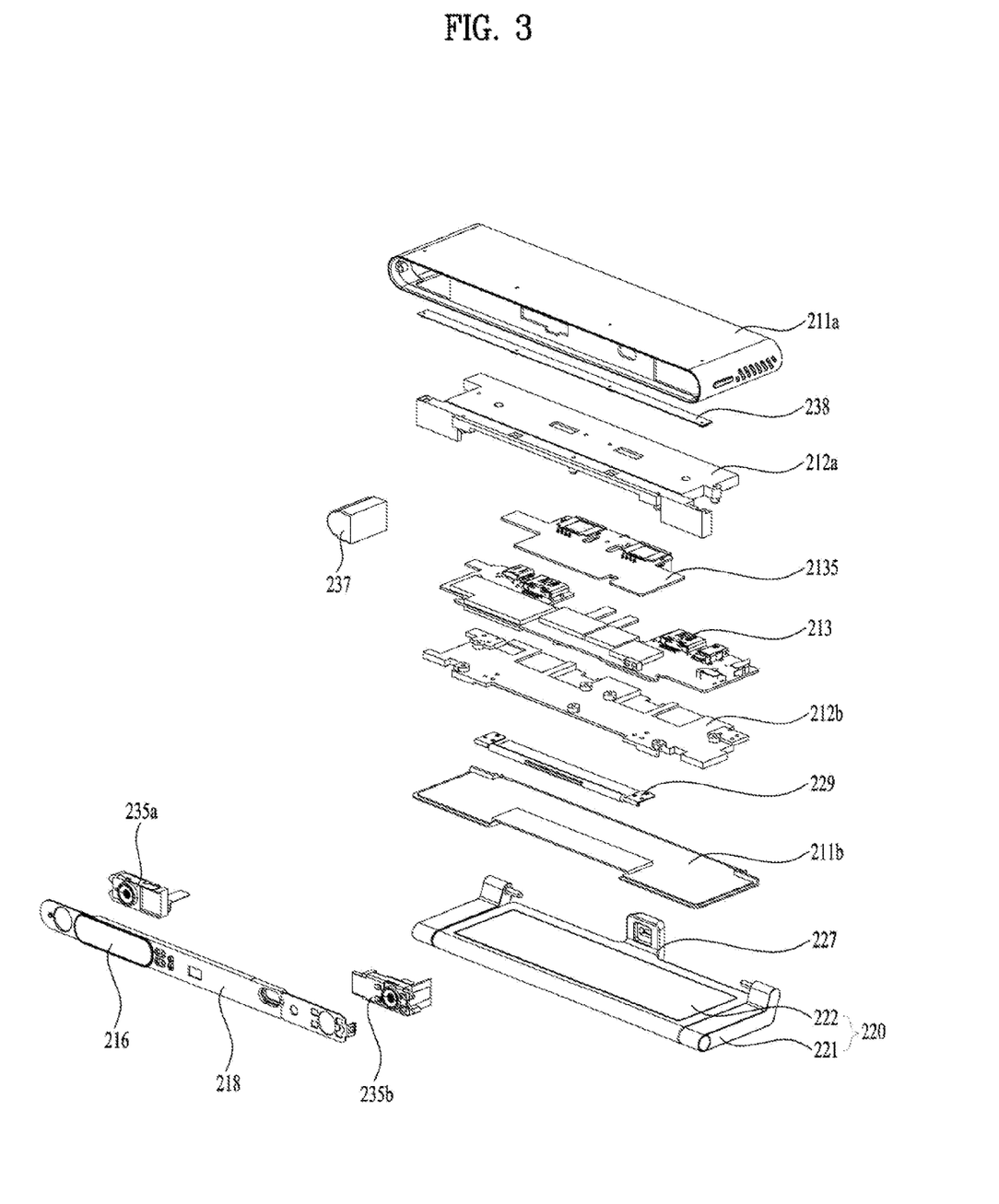
FIG. 3 is an exploded perspective diagram of a video camera according to the present disclosure.

FIG. 3 is an exploded perspective diagram of a video camera 200 according to the present disclosure. The video camera 200 of the present disclosure includes a housing 211a and 211b of a body 210 in which cameras 235a and 235b and a board unit 213 are located, and is provided with a stand 220 coupled to the housing 211a and 211b of the body 210.

As the housing 211a and 211b of the body 210 is implemented in a rectangular box shape, it is advantageous in minimizing a volume and facilitating portability. In addition, as shown in FIG. 2(a), when the housing 211a and 211b of the body 210 mounted on a top side of the display device 100, since the housing 211a and 211b of the body 210 has a shape long in a horizontal direction, it is not projected from the top side of the display device 100. Namely, although the housing 211a and 211b of the body 210 is installed on the top side of the display device 100, it is able to minimize the influence on an exterior of the display device 100.

As the housing 211a and 211b of the body 210 is disposed long in a horizontal direction, a front side has a wide area, various types of cameras such as a wide angle camera 235a, an IR camera 235b and the like may be installed. When more various types of the cameras 235a and 235b are provided, a sensing range becomes wider.

For example, the wide angle camera 235a may capture a wide area without a blind spot, and the IR camera 235b may recognize an object even at dark night. In addition, since it is possible to detect the distance, it is possible to obtain distance information necessary for controlling IOT devices.

In addition to the cameras 235a and 235b, electronic components such as an illumination sensor, a temperature sensor, a proximity sensor, a microphone 218, a speaker 217 and the like may be mounted together to expand functions.

Since the housing 211a and 211b of the body 210 forms an external appearance, the housing 211a and 211b may be formed by injection molding and my further include a metal frame 212 for mounting electronic components such as the board unit 213, the cameras 235a and 235b and the like with internal rigidity. A window covering the cameras 235a and 235b and sensors located on the front side may be included. A camera cover 216 capable of physically covering a camera may be included to protect personal privacy. The camera cover 216 may slide to move and selectively open and close the camera 235a. The camera cover 216 of the present disclosure is disposed only on a side of the wide-angle camera 235a, but may also be installed on a side of the IR camera 235b. A stand 220 is fastened to the body 210 and, more specifically, may be coupled to a rigid frame 212 to support a force. The stand 220 of the present disclosure may be folded to be in a manner of getting close contact with a bottom side of the body housing 211b as shown in FIG. 1(a), and an angle thereof may be changed as shown in FIG. 1(b) to adjust a position with respect to a bottom surface of the body 210.

As shown in FIG. 1(a), the stand 220 of the video camera 200 according to the present disclosure may be folded so that the stand 220 is in close contact with the body housing 211b, thereby being portable and facilitating height adjustment advantageously.

Figure 4:
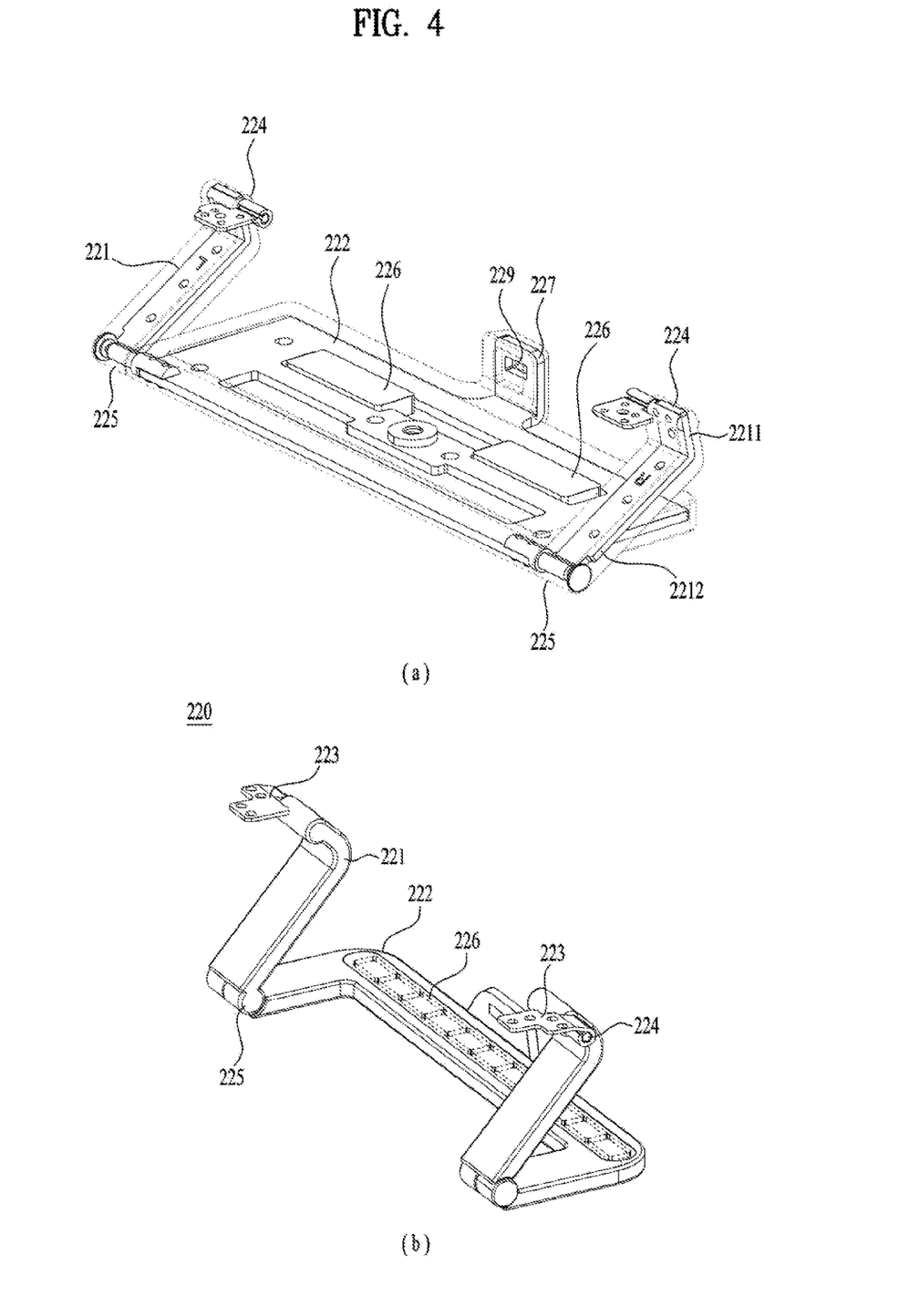
FIG. 4 is a perspective diagram showing a stand of a video camera according to the present disclosure.

FIG. 4 is a perspective diagram showing a stand 220 of a video camera 200 according to the present disclosure.

The stand 220 of the present disclosure may include a leg bracket 223 coupled to the body 210, a first leg 221 rotatably coupled to the leg bracket via a first hinge 224, and a second leg 222 rotatably coupled to the first leg 221 via a second hinge 225.

The stand 220 may include a single leg bracket 223, a first leg 221, a second leg 222, a first hinge 224 and a second hinge 225. Alternatively, as shown in FIG. 4, the stand 220 may include a pair of leg brackets 223, a pair of first legs 221, a pair of first hinges 224 and a pair of second hinges 225m, and a second leg 222 is connected in-between to be integrally configured.

If only one leg is provided, it may be inclined to one side, hence degrading stability. If the leg is configured in a wide shape in a side direction for stability, an area of a leg may be widened unnecessarily.

When the stands 220 are provided at both sides thereof, respectively, each leg should be adjusted. When the shapes of the stands 220 at both sides thereof are different from each other, the body 210 may be inclined in a lateral direction. Thus, a pair of the first legs 221 may be coupled to both sides of the body 210, thereby providing stability.

The second leg 222 is located between the first legs 221, and may be connected to a pair of the first legs 221 via the second hinges 225. The second leg 222 may be configured in a plate shape having a large area to provide a sense of stability as a portion in contact with the mounting surface. Alternatively, as shown in FIG. 4(b), the second leg 220 may have a U-shape of which front side is omitted.

The second leg 222 forms the mounting surface, and the first leg 221 plays a role in adjusting a height angle between the second leg 222 and the body 210.

The first leg 221 and the second leg 222 may be configured to have the same thickness, and when the second hinge 555 between the first leg 221 and the second leg 222 is folded to become 0°, the first leg 221 and the second leg 222 may overlap or form the same plane.

As shown in FIG. 3, when the second leg is disposed between the first legs, the thickness of the stand may be minimized when the stand is folded.

As shown in FIG. 1(a), the first leg 221 and the second leg 222 may be disposed in parallel with a bottom surface of the housing 211a and 211b of the body 210 in a state in which both of the first hinge and the second hinge are folded to form 0°.

The second leg 222 of the present disclosure may include a magnet 226, as shown in FIG. 4. Recently, as the thickness of the display device 100 decreases, a case may uses a galvanized steel plate for rigidity or an inner member made of a metal material may be provided in the case, and thus the second leg 222 may be attached to the display device 100 through a magnetic force of the magnet 226.

The stand 220 of the video camera 200 of the present disclosure may adjust an angle between the body 210 and the first leg 221 and an angle between the first leg 221 and the second leg 222 through the first hinge 224 and the second hinge 225, thereby changing the shape of the stand 220 in various forms.

The first leg 221 may have a bent shape. That is, an upper leg to which the first hinge 224 is coupled and a lower leg to which the second hinge 225 is coupled may have a bent shape. Since the first hinge 224 coupled to the leg bracket 223 is located in a backside direction of the body 210 in order to increase the fastening force by horizontally coupling the leg bracket 223 to the frame 212, a first end portion of the first leg 221 is located over a bottom side of the body 210.

Figure 5:
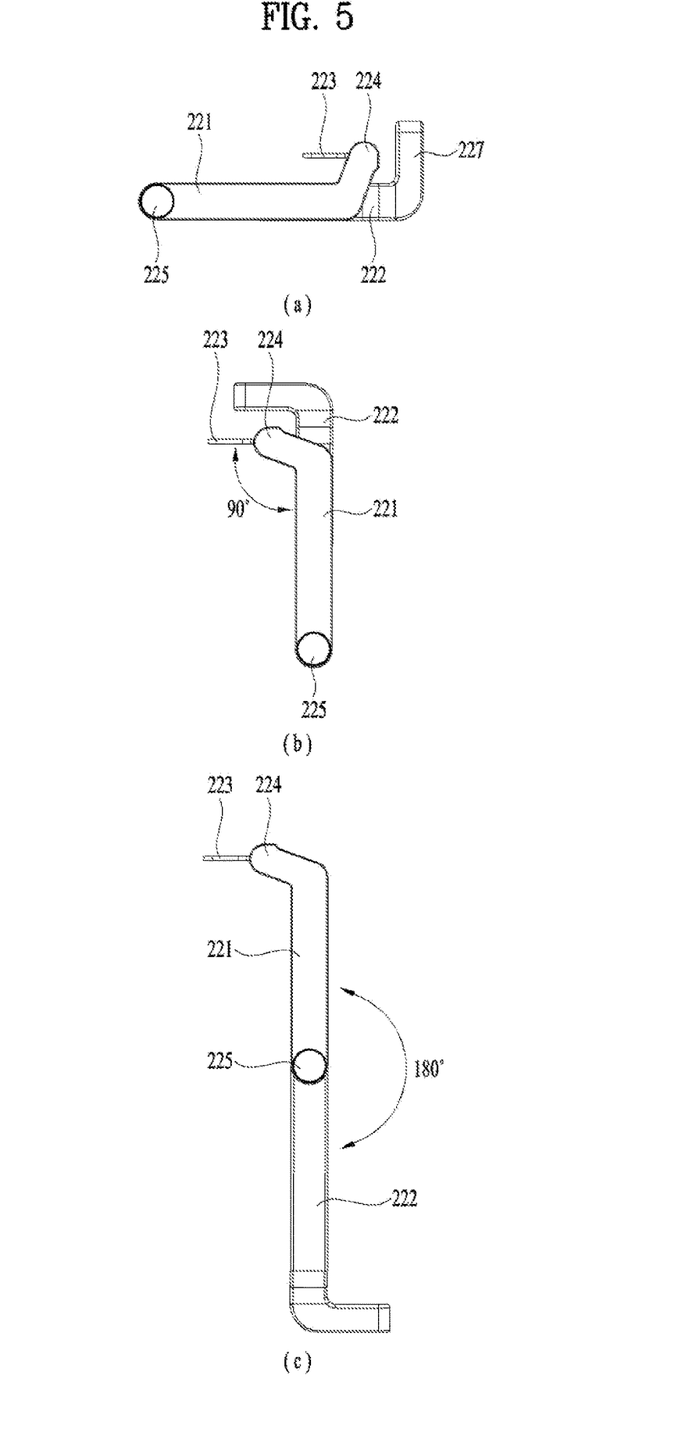
FIG. 5 is a diagram showing a hinge rotation range of a stand of a video camera according to the present disclosure.

As shown in FIG. 1(a), the first leg 221 may be configured to implement a length, which corresponds to a height difference between the first end portion to which the leg bracket 223 is coupled and the bottom surface of the housing 211a and 211b of the body 210, with the upper leg 2211 and have the upper leg 2211 bent with the lower leg 2212. The upper leg 2211 and the lower leg 2212 may be bent with each other while forming a curve. FIG. 5 is a diagram showing a range of a rotatable angle between the first hinge 224 and the second hinge 225. The first hinge 224 and the second hinge 225 may be disposed in parallel with each other, the first hinge 224 may rotate within a range of 90° as shown in FIG. 5(a) and FIG. 5(b), and the second hinge 225 may rotate within an angle range of 180° as shown in FIG. 5(b) and FIG. 5(c).

Since each of the first hinge 224 and the second hinge 225 has friction, an angle thereof is changed when a force of a predetermined size or more is applied. Since the weight of the body 210 is only a few hundred grams, the angle is not changed by the weight of the body 210.

Figure 6:
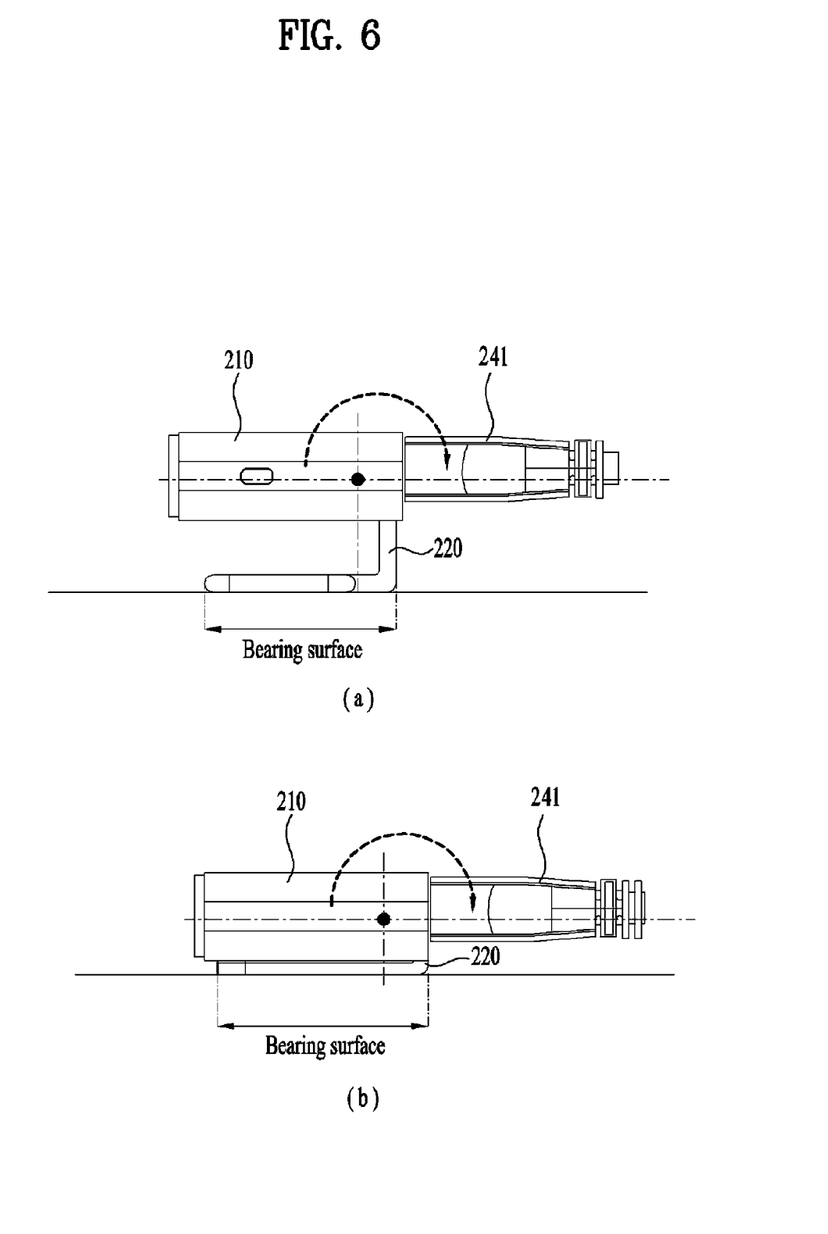
FIG. 6 is a diagram showing an example of a stand of a video camera of a related art.

FIG. 6 is a diagram showing an example of a stand 220 of a video camera 200 of a related art. Since a plug 241 of a USB, a HDMI cable or a power cable is connected to a backside of the video camera 200, the center of gravity of the video camera 200 may be located slightly in a backside direction from the center of a body 210.

When the center of gravity of a bearing part is located at the center of a bearing surface of the stand 220, stable mounting is possible. However, when the stand 220 has a length corresponding to a front-rear direction length of the body 210, as shown in FIG. 6(a), the center of gravity is biased in a backside direction, and thus a front side of the video camera 200 is easily inclined upward. As shown in FIG. 6(b), when the body 210 is in close contact with the stand 220, stable mounting is possible, but it is difficult to adjust the height and angle of the body 210.

Figure 7:
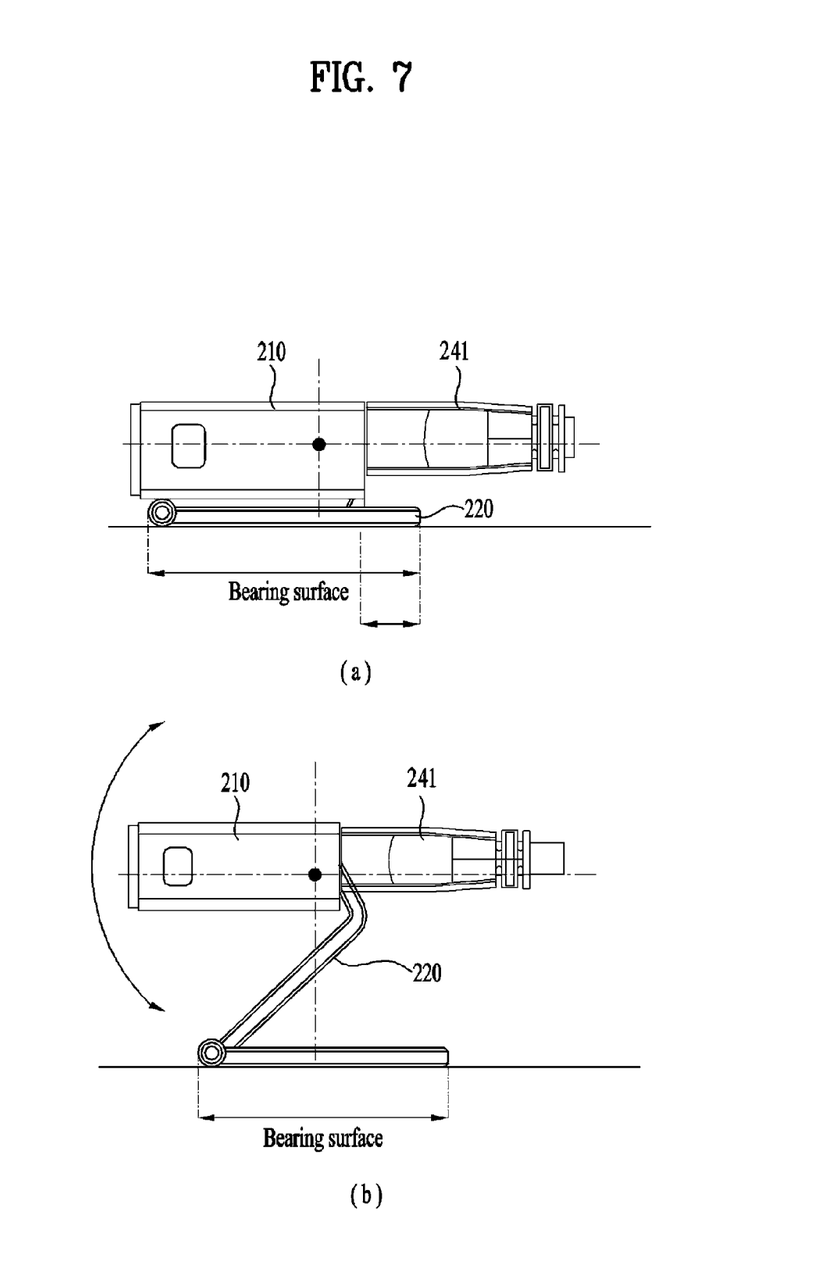
FIG. 7 is a diagram showing a form of mounting a video camera of the present disclosure on a floor.

FIG. 7 is a diagram showing a form of mounting a video camera 200 of the present disclosure on a floor. A stand 220 of the video camera 200 of the present disclosure is configured to extend partially in a backside direction of the body 210 so as to reinforce the bearing force in a backside direction of the center of gravity.

As shown in FIG. 7(a), the body 210 can be stably mounted while being in close contact with a floor surface. As shown in FIG. 7(b), the height of the body 210 may be increased by adjusting angles of the first hinge 224 and the second hinge 225. In this case, since a position of the body 210 with respect to the second leg 222 (a bearing surface) moves in a front direction, even when the body 210 is spaced apart from the bearing surface, the center of gravity moves in a central direction of the bearing surface, whereby the body 210 may be stably mounted.

Since the angle of the body 210 can be freely adjusted by adjusting the angle of the first hinge 224, the cameras 235a and 235b may be disposed in a desired direction even when the mounting surface is positioned on a floor side or above.

Figure 8:
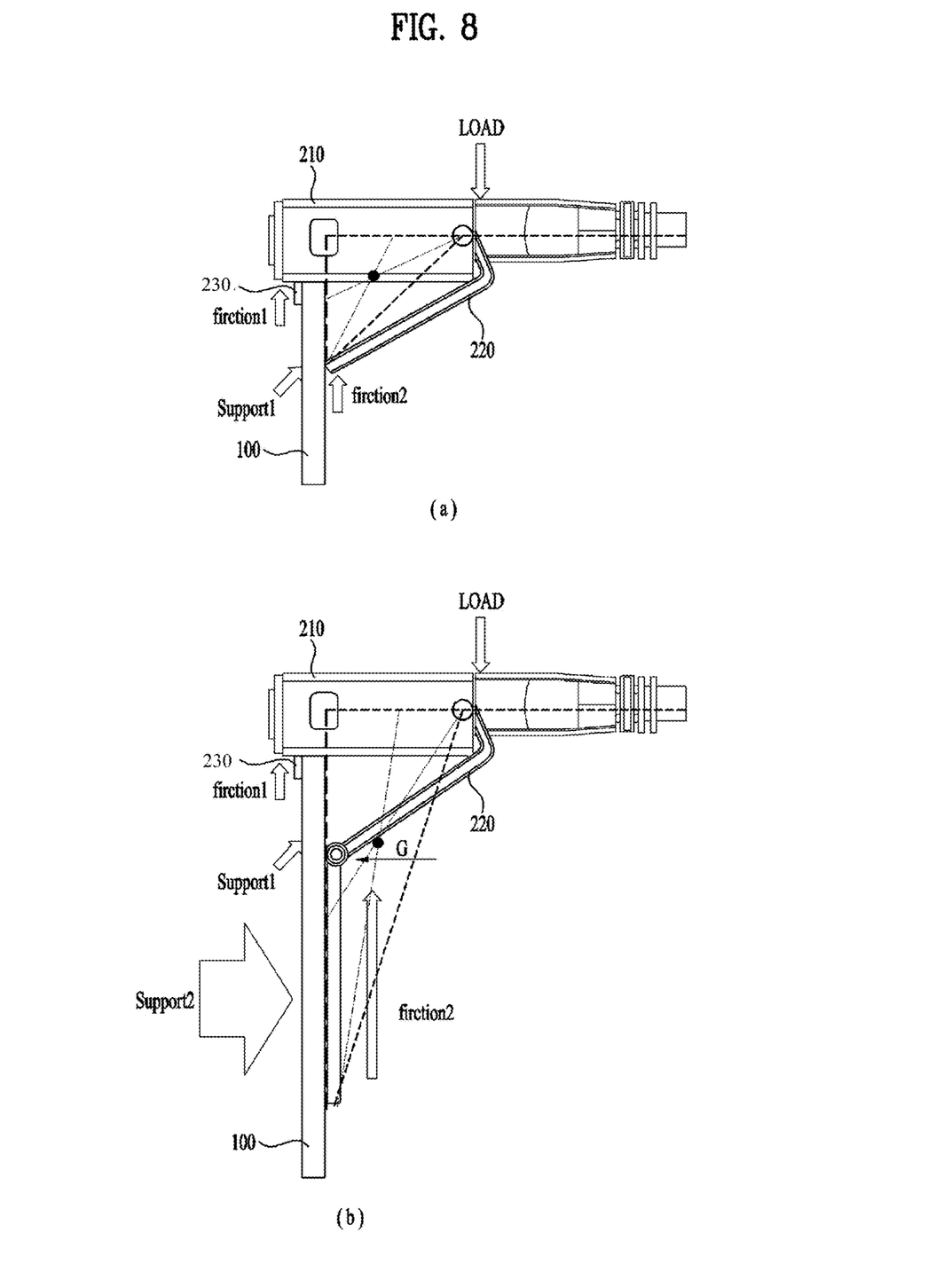
FIG. 8 is a diagram showing a state in which a video camera of the present disclosure is mounted on a display device depending on a presence or absence of a second leg.

FIG. 8 is a diagram showing a state in which the video camera 200 of the present disclosure is mounted on the display device 100 depending on a presence or absence of the second leg 222.

FIG. 8(a) shows s a video camera having no second leg 222 according to a related art, and FIG. 8(b) shows an embodiment of the video camera 200 having the second leg 222 according to the present disclosure.

Although a clip shape is conventionally used to be applied to the display device 100 according to various thicknesses and backside shapes, a top bezel of a predetermined size or more is required in the display device in order to stably fix a clip-shaped stand.

Recently, as there are products in which the bezel size of the display device 100 is small and less than 1 cm, a stand applicable to a thick display device 100 as well as to a product with a small bezel is required.

A front leg 230 positioned on a front bottom side of the body 210 may be included so as to contact a front top side of the display device 100. The video camera 200 located above the display device 100 may weigh in a backside direction, and the front leg 230 may be in close contact with the front top side of the display by the weight of the video camera 200.

The front leg 230 may be disposed at a position that does not overlap the stand 220 in a folded state so that the stand 220 may be in close contact with the body 210 while it is in the folded state.

As shown in FIG. 8(a), the first leg 221 may contact a backside of the display device 100 to support the weight of the body 210. However, in the shape of the stand 220 without the second leg 222, since only an end portion of the first leg 221 of the stand 220 contacts the display device 100, an area in which the stand 220 contacts the display device 100 is small, and thus a bearing force is weak.

Accordingly, according to an embodiment of the present disclosure including the second leg 222 as shown in FIG. 8(b), a contact area between the stand 220 and the display device 100 increases, thereby increasing a frictional force and a reaction force by the second leg 222.

Since the display device 100 includes a metal material in a backside case or at least an inside thereof, the stand 220 may be fixed to the display apparatus 100 through a magnetic force of the magnet 226 positioned in the second leg 222.

Figure 9:
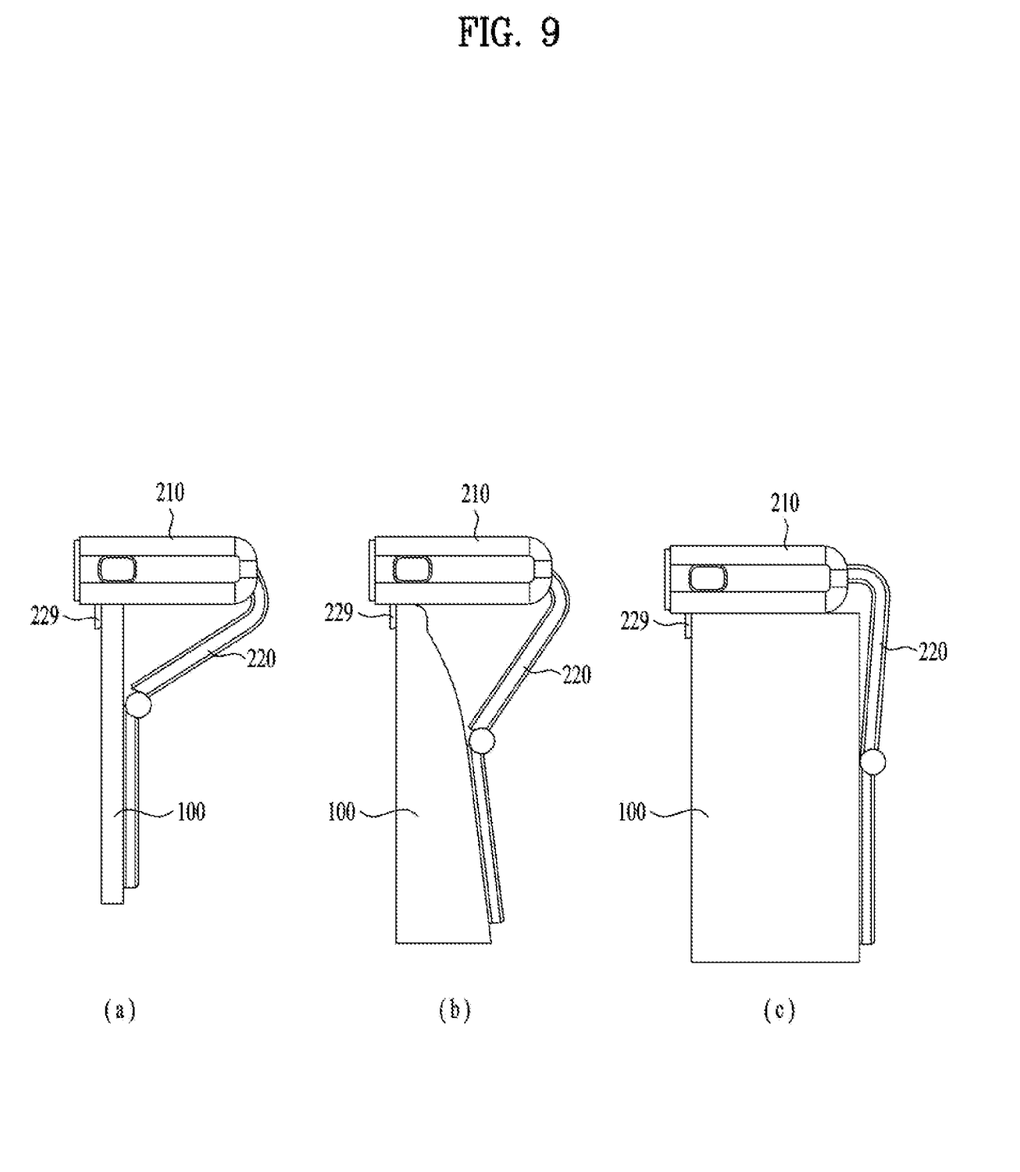
FIG. 9 is a diagram showing aspects in which a video camera of the present disclosure is mounted on each of display devices in various shapes.

FIG. 9 is a diagram showing aspects in which the video camera 200 of the present disclosure is mounted on each of the display devices 100 in various shapes. FIG. 9 (a) is a diagram showing that the video camera 200 of the present invention is mounted on a thin display device 100, FIG. 9(b) is a diagram showing that the video camera 200 of the present invention is mounted on a display device 100 having an inclined surface on a backside thereof, and FIG. 9(c) is a diagram showing that the video camera 200 of the present invention is mounted on a thick display device 100.

The angles of the first leg 221 and the second leg 222 may be adjusted by using the first hinge 224 and the second hinge 225 to correspond to the thickness and backside shape of the display device 100 to have the video camera 200 mounted thereon.

The second leg 222 comes in close contact with the backside of the display device 100, and the angles of the first hinge 224 and the second hinge 225 may be changed so that the first leg 221 can connect the body 210 and the second leg 222 irrespective of the thickness and backside shape of the display device 100.

As shown in FIG. 8, the second leg 222 may be fixed to the backside of the display device 100 through the friction force of the second leg 222 and the magnetic force of the magnet 226 installed in the second leg 222, and the first leg 221 may support the body 210 to enable the video camera 200 to be fixed to the top side of the display device 100 as shown in FIG. 9.

Figure 10:
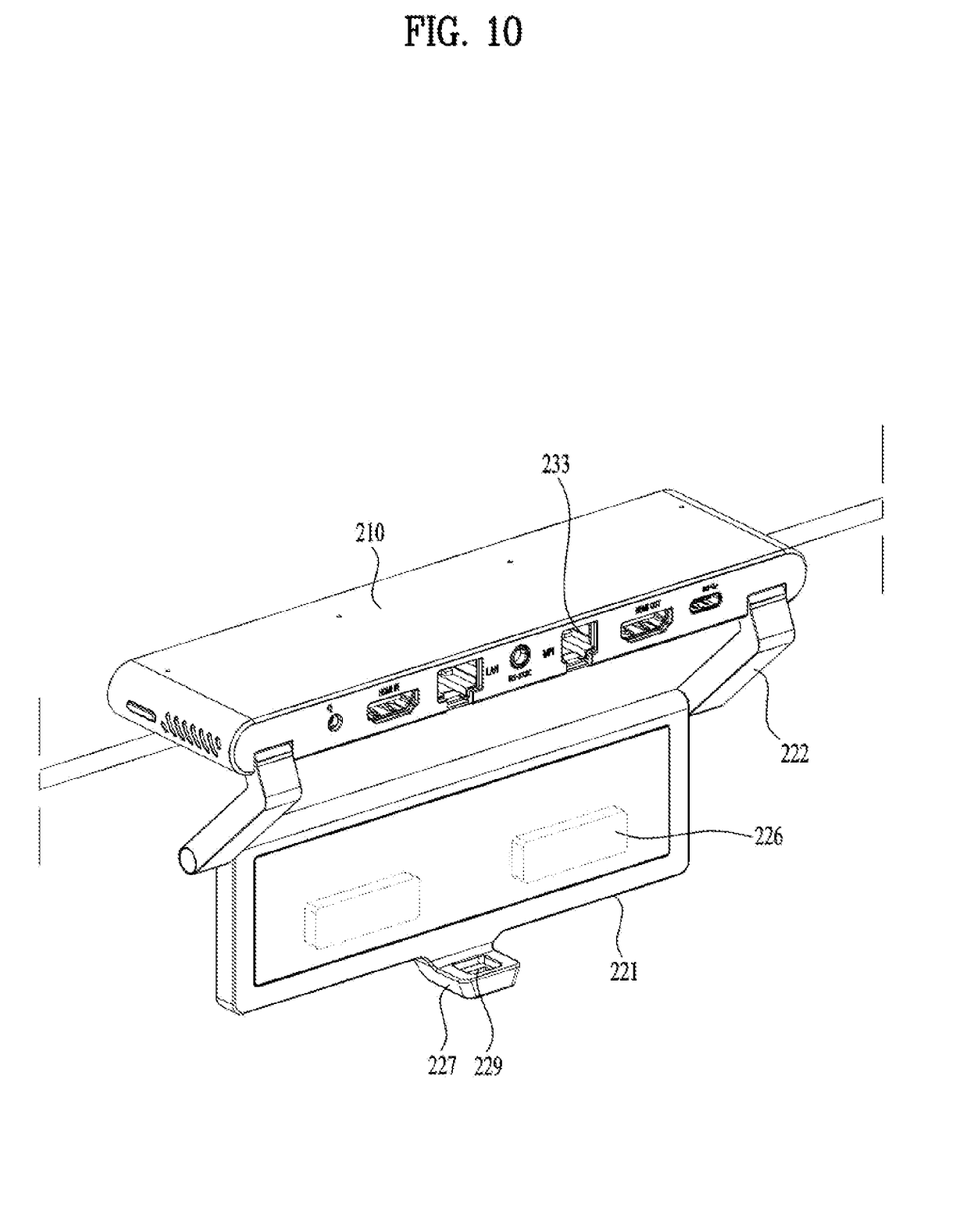
FIG. 10 is a rear view diagram showing a state in which a video camera of the present disclosure is mounted on a display device.

FIG. 10 is a rear view diagram showing a state in which the video camera 200 of the present disclosure is mounted on the display device 100. A power terminal or a cable terminal connected to an external device may be disposed on the backside of the body, and the cable terminal may be positioned between a pair of the first legs 221.

A security hole 229 located in the stand 220 of the video camera 200 may be further included.

The security hole 229 is a device in which a locking device such as a Kensington locker can be inserted. The video camera 200 may be installed in a public place, and in this case, there is a risk of theft.

The theft of the video camera 200 may be prevented through the security hole 229 into which a lock device inserted into the hole and then expanded to be fixed therein, such as a Kensington locker, can be inserted.

The position of the security hole 229 is not limited, but when the security hole 229 is formed in a rear side of the body 210, the center of gravity of the body 210 may be further biased in a backside direction, and when the security hole 229 is formed in the first leg 221 on one side, the left and right balance of the center of gravity may collapse.

When the security hole 229 is formed in the second leg 222, as the second leg 222 is configured to be in close contact with the bearing surface, and thus it is difficult to fasten the lock device in a mounted state.

Therefore, as shown in FIG. 10, the security hole 229 may be formed in a protrusion 227 protruding from an end portion of the second leg 222, and the second leg 222 may extend more in a backside direction than the body 210 so that the protrusion 227 fails to overlap the first leg 221 in a folded state of the stand 220.

As described above, the video camera 200 of the present disclosure can be installed not only on a floor, but also on a monitor or a wall, so that it can be easily installed in various places.

As the stand 220 of the video camera 200 according to the present disclosure includes two hinges 224 and 225, it may be installed on any one of displays having various shapes and thicknesses.

In addition, since an area of a mounting surface is wide, stable mounting is possible.

The above detailed description should not be construed as being limitative in all terms, but should be considered as being illustrative. The scope of the present invention should be determined by reasonable analysis of the accompanying claims, and all changes in the equivalent range of the present invention are included in the scope of the present invention.

What is claimed is:

1. A video camera comprising:
   a body;
   a camera module installed in the body; and
   a stand connectable to an underside of the body so as to support the body, the stand comprising:
      a leg bracket coupled to the body;
      a first leg rotatably coupled to the leg bracket through a first hinge at a first end portion of the first leg; and
      a second leg rotatably coupled to a second end portion of the first leg through a second hinge,
   wherein, when the first leg is rotated away from the leg bracket at an angle larger than 0 degrees, the second leg is rotatably coupled through the second hinge to independently rotate away from the first leg.

2. The video camera of claim 1,
   wherein the leg bracket is coupled to the body by being fastened to a backside of the body, and
   wherein the stand further comprises a front leg located on a bottom front side of the body.

3. The video camera of claim 2, wherein the front leg is hinged to a bottom side of the body so as to contact the bottom side of the body and to extend in a vertical direction of the bottom side of the body.

4. The video camera of claim 1, further comprising a security hole located in the second leg and configured to have a lock device coupled thereto.

5. The video camera of claim 4,
   wherein the security hole is formed in a protrusion portion protruding from the second leg, and
   wherein the protrusion portion is located in a backside direction of the body while the second leg and the first leg are folded to form an angle of 0° therebetween.

6. The video camera of claim 1,
   wherein the first leg comprises a pair of legs, a left leg of the pair of legs provided at a left side of the body, and a right leg of the pair of legs provided at a right side of the body,
   wherein the second leg is located between the pair of the legs so as to be connected to the left leg and the right leg pair on sides thereof through a corresponding second hinge.

7. The video camera of claim 6, further comprising a cable terminal located between the pair of legs.

8. The video camera of claim 1, wherein the second leg forms a common plane with the first leg while the second leg and the first leg are folded to form an angle of 0° in between.

9. The video camera of claim 1, comprising a tripod nut provided to a bottom side of the second leg.

10. The video camera of claim 1, further comprising a magnet provided to the second leg.

11. The video camera of claim 1, wherein the first leg comprises:
    an upper leg connected to the first hinge; and
    a lower leg extending from the upper leg by being bent with respect to the upper leg.

12. A video camera comprising:
    a body;
    a camera module installed in the body; and
    a stand connectable to an underside of the body so as to support the body, the stand comprising:
       a leg bracket coupled to the body;
       a first leg rotatably coupled to the leg bracket through a first hinge; and
       a second leg rotatably coupled to an end portion of the first leg through a second hinge,
    wherein an angle of the body and a height of the body are adjustable by adjusting at least one of an angle of the first hinge or an angle of the second hinge,
    wherein the first leg comprises a pair of legs, a left leg of the pair of legs provided at a left side of the body, and a right leg of the pair of legs provided at a right side of the body,
    wherein the second leg is located between the pair of the legs so as to be connected to the left leg and the right leg pair on sides thereof through a corresponding second hinge, and
    wherein the video camera further comprises a cable terminal located between the pair of legs.

* * * * *